United States Patent
Horman et al.

(10) Patent No.: US 9,678,860 B2
(45) Date of Patent: Jun. 13, 2017

(54) UPDATING DATA FIELDS OF BUFFERS

(71) Applicant: Red Hat, Inc., Raleigh, NC (US)

(72) Inventors: Neil Horman, Raleigh, NC (US); Andrew Gospodarek, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 294 days.

(21) Appl. No.: 13/689,220

(22) Filed: Nov. 29, 2012

(65) Prior Publication Data
US 2014/0149709 A1 May 29, 2014

(51) Int. Cl.
*G06F 12/02* (2006.01)
(52) U.S. Cl.
CPC .................... *G06F 12/023* (2013.01)
(58) Field of Classification Search
CPC .......... G06F 3/0644; G06F 12/023; G06F 2212/1044; G06F 2205/063; G06F 9/5016; G06F 3/0665; G06F 5/065; G06F 3/0608; G06F 12/0253; G06F 2212/601; G06F 2212/652; G06F 3/064; G06F 3/0656; G06F 9/4555
See application file for complete search history.

(56) References Cited

U.S. PATENT DOCUMENTS

| | | | | |
|---|---|---|---|---|
| 5,956,745 | A * | 9/1999 | Bradford | G06F 3/0605 360/48 |
| 2001/0056522 | A1* | 12/2001 | Satyanarayana | G06F 9/4435 711/170 |
| 2005/0008011 | A1* | 1/2005 | Georgiou et al. | 370/389 |
| 2005/0086448 | A1* | 4/2005 | Anand | G06F 12/023 711/170 |
| 2009/0006502 | A1* | 1/2009 | Leung et al. | 707/205 |
| 2011/0185140 | A1* | 7/2011 | Arakawa | G06F 3/0605 711/165 |
| 2011/0197031 | A1* | 8/2011 | Aho | G06F 12/0844 711/130 |

* cited by examiner

*Primary Examiner* — Rocio Del Mar Perez-Velez
(74) *Attorney, Agent, or Firm* — Lowenstein Sandler LLP

(57) ABSTRACT

A computing system can include memory management capabilities. In one embodiment, the system receives a request to update a first size of each of a plurality of portions of memory to a second size. The plurality of portions of memory can be associated with a first memory pool and the first memory pool can be associated with a memory pool instance. The system creates a memory pool subinstance based on the request. The memory pool subinstance can be associated with the memory pool instance. The system associates a second memory pool with the memory pool subinstance. The second memory pool comprises portions of memory of the second size and the second memory pool is associated with the memory pool instance.

13 Claims, 6 Drawing Sheets

UPDATING DATA FIELDS OF BUFFERS

TECHNICAL FIELD

Embodiments of the present disclosure relate to memory management, and more particularly, to a technique for updating portions of memory in a memory pool, such as dynamically updating data fields of buffers.

BACKGROUND

Many memory management mechanisms, such as memory pool allocation (e.g., slab allocation), exist for the efficient memory allocation of portions of memory (e.g., kernel objects) which display the desirable property of eliminating fragmentation caused by allocations and deallocations. These mechanisms can retain allocated memory that contains a portion of memory of a certain type, such as a data object of a certain type, for reuse upon subsequent allocations of portions of memory of the same type.

The primary motivation for these memory management mechanisms is that the initialization and destruction of the portions of memory can actually outweigh the cost of allocating memory for them.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Figure 1:
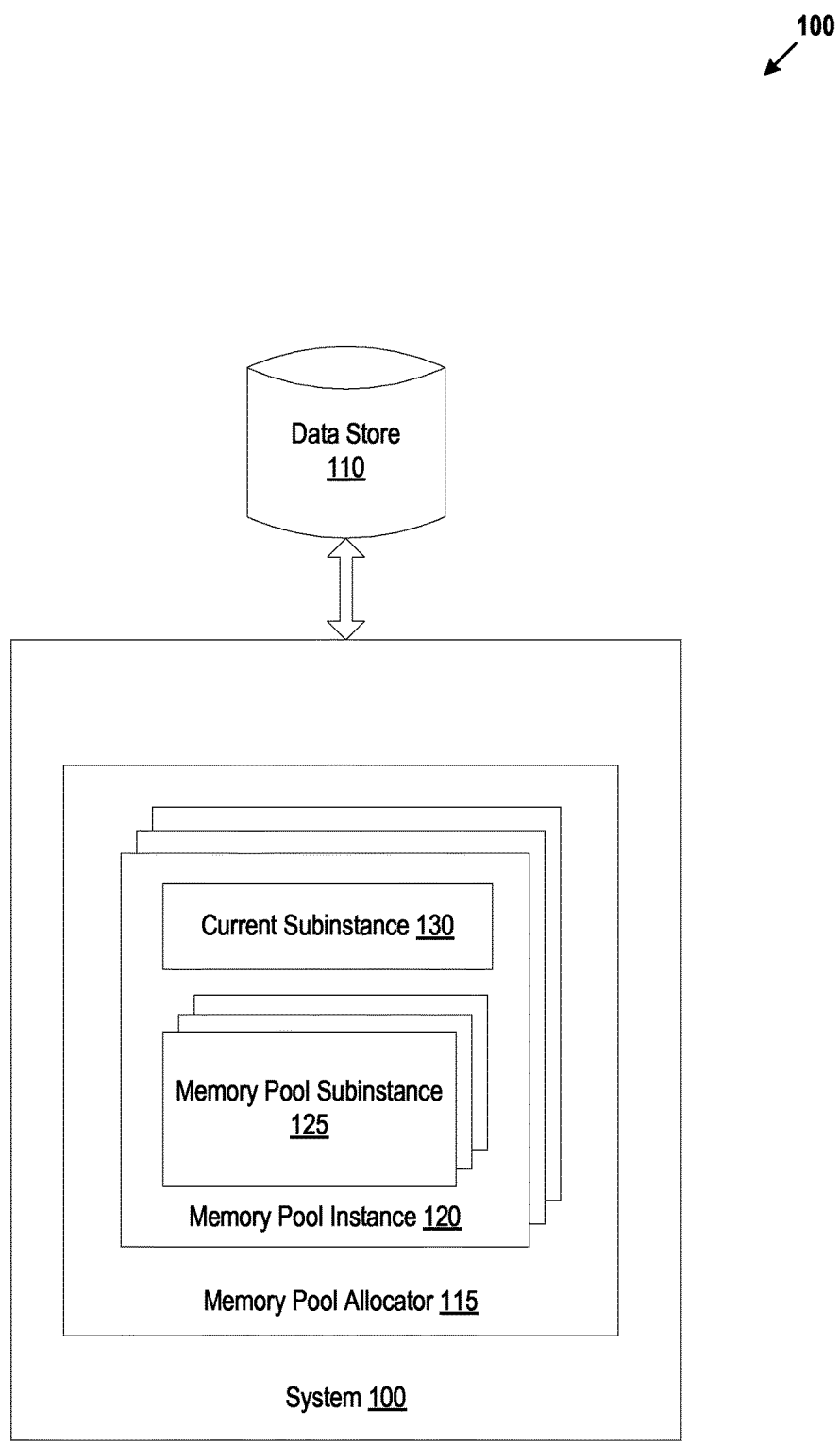
FIG. 1 illustrates example of a system architecture, in accordance with various embodiments of the present disclosure.

Embodiments of the disclosure are directed to a method and system for updating portions of memory in a memory pool, such as dynamically updating data fields of buffers.

With memory pool allocation (e.g., slab allocation, which is memory management mechanism intended for the efficient memory allocation of kernel objects), memory pools suitable to fit portions of memory (e.g., buffers) of certain type or size are preallocated. A memory pool allocator can keep track of the memory pools, and can create a memory pool instances (e.g., cache) for each type or size of memory. A memory pool represents one or more contiguous pages in the memory containing pre-allocated portions of memory. When a request to allocate a portion of memory of a certain type is received by the memory pool allocator, the memory pool allocator can instantly satisfy the request with an already allocated slot. Destruction of the portion of memory, such as deallocation of the portion of memory, does not free up the memory, but only opens a portion of memory in the memory pool which is put in the list of free portions of memory associated with the memory pool. The next call to allocate memory of the same size can return the now unused portion of memory. This process eliminates the need to search for suitable memory space and greatly alleviates memory fragmentation.

Memory pool allocation is often used for network buffers. Typically, in a general purpose operating system, network buffers are allocated from a store of pre-sized portions of memory, such as a memory pool. Network buffers must be allocated, freed, and accessed very quickly to satisfy the throughput requirements of modern networking equipment (e.g., 40 Gbps). Moreover, multiple subsystems within an operating system may want to store per-packet data (e.g., connection tracking firewall code). The throughput requirements demand that the network buffer structure be smaller for speed and performance. However, the multiple subsystems demand more space in the network buffer metadata to accommodate the growing feature set found within a general purpose operating system network stack.

Embodiments of the disclosure allow the operating system, memory management applications, or a user, using an Application Programming Interface (API) to change the size of portions of memory within a memory pool for a particular memory pool instance. For example, a request can be received to update the size of a network buffer because additional metadata needs to be stored for each packet in the network buffer. The memory pool instance creates a memory pool subinstance based on the request and a memory pool is associated with the memory pool subinstance. The memory pool is divided into portions of memory of the updated size. The memory pool instance updates a current subinstance based on the memory pool subinstance, such that the memory pool allocator can use the new memory pool subinstance when allocating portions of memory for the memory pool instance, such that the portions of memory contain the updated amount of space. Embodiments of the disclosure can monitor deallocation requests for portions of memory, such that the portions of memory are returned to the memory pool subinstance from which the portions of memory were allocated. When all portions of memory for a non-current subinstance are returned, the non-current subinstance can be destroyed.

By allowing the operating system or memory management applications to change the size of portions of memory of a memory pool, such as the network buffer metadata area, the portions of memory can be minimally sized, and can grow or shrink in response to the needs of active subsystems within an operating system or memory management applications. Moreover, by dynamically creating portions of memory (e.g., slab cache) while the subsystems or applications are running, only subsystems which are actively in use will have the required space allocated when the portions of memory are allocated from the memory pools.

FIG. 1 illustrates an example of a system 100 in which embodiments can be implemented. System 100 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments may operate within a single computing device or on multiple computing devices.

Data store 110 can be hosted by one or more writable persistent storage devices, such as memories, tapes or disks. In one embodiment, the one or more writable persistent storage devices are not Random Access Memory (RAM) devices, and can include devices such as hard drives, tapes, magnetic disks, optical disks, etc.

Although each of system 100 and data store 110 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The data in the data store 110 can include data related to the system 100. Examples of data related to the system 100 can include, and are not limited to, memory used by applications running on system 100, and any other electronically stored information that can be associated with a system, etc.

During operation of the system 100, the system 100 can allocate memory pools, or slabs, for subsystems and applications running on the system 100. In one embodiment, the system 100 can include a memory pool allocator 115 to allocate the memory pools.

The memory pool allocator 115 manages partitions of memory that are divided on page boundaries (e.g., 4096 bytes, 8192 bytes, etc.). The memory pool allocator 115 can first partition memory on page boundaries and then create memory pools from each partition that is not on a page boundary. For example, the memory pool allocator 115 can create memory pools from portions of memory (e.g., slabs) of a predetermined size for buffers, such as the size of a network buffer, a file system buffer, etc. For example, the memory pool allocator 115 can create memory pools for portions of memory that are 200 bytes, 250 bytes, or any other size that does not fit on a machine-coded boundary (e.g., a page of memory).

The memory pool allocator 115 can receive a request to create a memory pool of a predefined size from the system 100. In one embodiment, the predefined size of the memory pool is a minimum size for the memory pool. For example, the memory pool allocator 115 can receive a "create slab cache (200 bytes)" request, which requests that a slab cache of a size of 200 bytes be created. Upon receiving the request to create a memory pool, the memory pool allocator 115 can create a memory pool instance 120 for a memory pool of the predefined size. The memory pool allocator 115 can generate an identifier (e.g., handle) for the memory pool instance 120 and return the identifier to the system 100. For example, the memory pool allocator 115 can generate a memory pool instance 120 with an identifier X for a "create slab cache (200 bytes)" and return the identifier X to the system 100.

The memory pool allocator 115 can create a memory pool subinstance 125 for the predefined size based on the request. The memory pool allocator 115 can associate the memory pool subinstance 125 with the memory instance 120 included in the request. The memory pool allocator 115 can generate an identifier for the memory pool subinstance 125 and update a current subinstance 130 with the identifier. In one embodiment, the current subinstance 130 stores the most recently created memory pool subinstance 125 associated with the memory pool instance 120. In an alternate embodiment, the current subinstance 130 stores the most recently used memory pool subinstance 125 associated with the memory pool instance 120. The current subinstance 130 can represent the memory pool subinstance 125 from which to allocate a memory portion when an allocation request is received for the memory pool instance 120 associated with the memory pool subinstance 125. The memory pool allocator 115 can provide the memory pool subinstance identifier for the memory pool subinstance 125 to the system 100.

The memory pool allocator 115 can create a memory pool with portions of memory whose size is equal to the predefined size. The memory pool allocator 115 can obtain one or more memory pages from a storage system, such as data store 110 and divide the one or more memory pages into portions of a size equal to the predefined size. The memory pool allocator 115 can associate the portions of memory with the memory pool subinstance 125 (e.g., associate the identifier for the memory pool subinstance 125 with the portions of memory). For example, the memory pool allocator 115 can receive a request from system 100 for a "create slab cache (200 bytes)," create a memory pool subinstance 125 with an identifier X, create a memory pool with portions of memory that are each 200 bytes, and associate the portions of memory with the identifier X.

The memory pool allocator 115 can receive a request to change the size of the portions in a memory pool from the system 100. The request can include an identifier for the memory pool instance 120 that the request is applicable to. Upon receiving the request to change the size of a memory pool, the memory pool allocator 115 can access the memory pool instance 120 that matches the identifier included in the request. In one embodiment, the request to change the size of the portions of the memory pool includes a memory pool subinstance identifier. In this embodiment, the updated size of the portions of the memory pool is a previous size of the portions of the memory pool, such as the original size of the portions when the memory pool instance 120 was initially created. In an alternate embodiment, the request to change the size of the portions of the memory pool includes an updated size for the portions of the memory pool. In one such embodiment, the updated size is a differential size to use to update existing portions of the memory pool (e.g., add 2 bytes to the existing portions, delete 2 bytes from the existing portions, etc.). In an alternate such embodiment, the updated size is a size for each portion of the memory pool (e.g., 202 bytes, 204 bytes, etc.).

The memory pool allocator 115 can create a memory pool subinstance 125 for the updated size. The memory pool allocator 115 can associate the memory pool subinstance 125 with the memory instance 120. The memory pool instance 115 can generate an identifier for the memory pool subinstance 125 and update the current subinstance 130 with the identifier. The memory pool allocator 115 can provide the memory pool subinstance identifier for the memory pool subinstance 125 to the system 100. The memory pool allocator 115 can create a memory pool with portions of memory whose size is equal to the updated size and associate the identifier for the memory pool subinstance 125 with the portions of memory.

The memory pool allocator 115 can receive a request to allocate a portion of memory. The request to allocate a portion of memory can include an identifier for a memory pool instance 120 from which to allocate the portion of memory. The memory pool allocator 115 can determine a memory pool subinstance 125 from which to obtain a portion of memory by accessing the current subinstance 130 associated with the memory pool instance 120. The memory pool allocator 115 can obtain a portion of memory from the memory pool subinstance 125 that has the identifier stored in the current subinstance 130 associated with the memory pool instance 120.

The memory pool allocator 115 can determine whether there is a portion of memory available to allocate in the memory pool subinstance 125. If there is a portion of memory available to allocate, the memory pool allocator 115 can obtain the portion of memory (either the portion itself or an identifier for the portion of memory, such as the memory address where the portion of memory starts). If there is no portion of memory available to allocate, the memory pool allocator 115 can obtain a memory page from a storage system, such as data store 110, divide the memory page into portions of a size associated with the memory pool subinstance 125, and obtain one of the portions of memory. The memory pool allocator 115 can associate the identifier of the memory pool subinstance 125 from which the portion of memory was obtained with the portion of memory and update a reference count associated with the memory pool subinstance 125.

The memory pool allocator 115 can receive a request to deallocate a portion of memory. The request to deallocate a portion of memory can include an identifier for a memory pool instance 120 from which to deallocate the portion of memory and the portion of memory to deallocate. The memory pool allocator 115 can determine a memory pool subinstance 125 to which to return a portion of memory by accessing an identifier associated with the portion of memory. The memory pool allocator 115 can deallocate the portion of memory for the memory pool subinstance 125 by adding an identifier for the portion of memory to a list of available memory portions for the memory pool subinstance 125.

The memory pool allocator 115 can update a reference count associated with the memory pool subinstance 125 once the portion of memory has been deallocated. In some embodiments, upon updating the reference count, the memory pool allocator 115 determines whether the memory pool subinstance 125 is equal to the current subinstance 130 associated with the memory pool instance 120. In some embodiments, the memory pool allocator 115 determines whether the reference count associated with the memory pool subinstance 125 is equal to a predetermined value. In some embodiments, if the memory pool subinstance 125 is not equal to the current subinstance 130 and the reference count associated with the memory pool subinstance 125 is equal to a predetermined value and, the memory pool allocator 115 returns the memory associated with the memory pool subinstance 125 to a storage system, such as data store 110, and deletes the memory pool subinstance 125.

Figure 2:
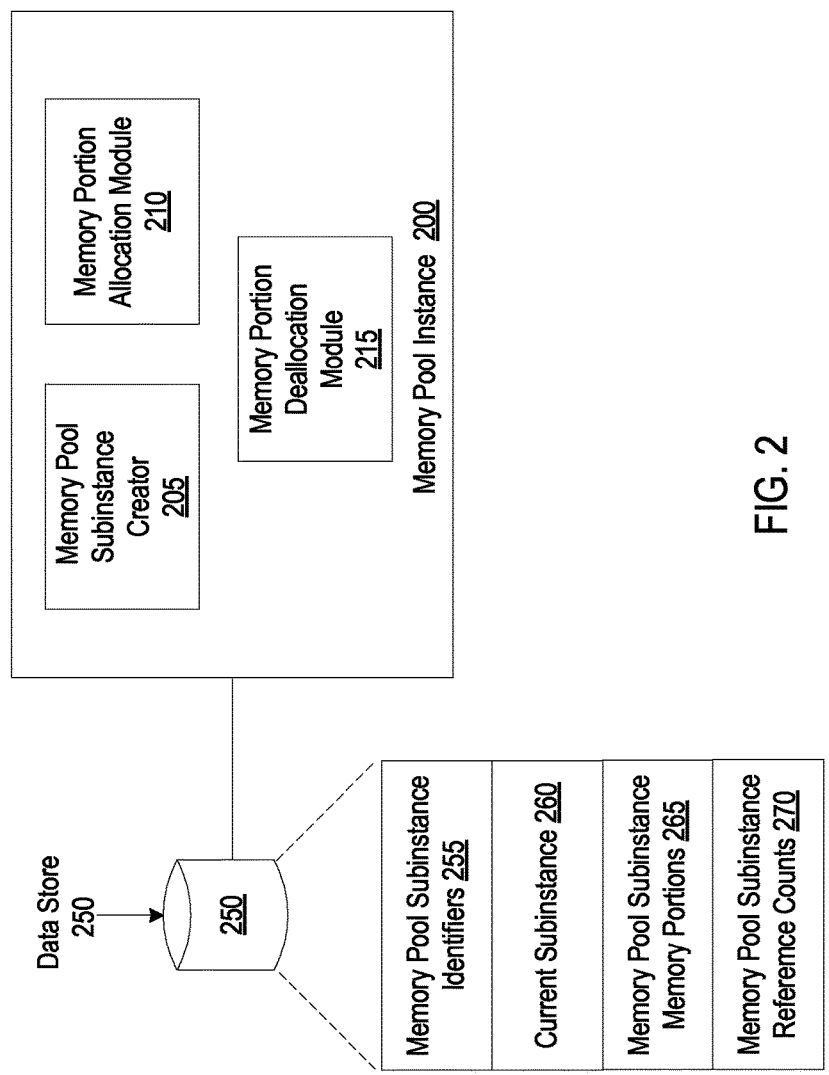
FIG. 2 is a block diagram of a memory pool instance, in accordance with an embodiment.

FIG. 2 is a block diagram of a memory pool instance 200, in accordance with one embodiment. The memory pool instance 200 includes a memory pool subinstance creator 205, a memory portion allocation module 210, and a memory portion deallocation module 215. Note that in alternative embodiments, the functionality of one or more of the memory pool subinstance creator 205, the memory portion allocation module 210, and the memory portion deallocation module 215 may be combined or divided.

Memory pool subinstance creator 205 can receive a request to create a memory pool of a predefined size. The memory pool subinstance creator 205 can create a memory pool subinstance for the predefined size. The memory pool subinstance creator 205 can create the memory pool subinstance by generating an identifier for the memory pool subinstance and creating a memory pool associated with the memory pool subinstance.

In one embodiment, the memory pool subinstance creator 205 generates a random identifier for the memory pool subinstance. In an alternate embodiment, the memory pool subinstance creator 205 generates an identifier for the memory pool subinstance based on the identifier stored in the current subinstance 260. In another alternate embodiment, the memory pool subinstance creator 205 generates an identifier for the memory pool subinstance based on a subinstance identifier previously generated by the memory pool subinstance creator 205. The identifier for the memory pool subinstance can be stored in a memory, such as memory pool subinstance identifiers 255 in data store 250. The memory pool subinstance identifiers 255 can store an identifier for each memory pool subinstance created by memory pool subinstance creator 205. In one embodiment, the memory pool subinstance identifiers stored in memory pool subinstance identifiers 255 are stored in an ascending or descending order based on when the memory pool subinstance identifiers were created.

The memory pool subinstance creator 205 can store the identifier of the memory pool subinstance in current subinstance 260. In one embodiment, the current subinstance 260 stores the memory pool subinstance most recently created by memory pool subinstance creator 205. In an alternate embodiment, the current subinstance 260 stores the memory pool subinstance most recently used by the memory pool instance 200.

The memory pool subinstance creator 205 can create a memory pool associated with the memory pool subinstance. The memory pool can include portions of memory whose size is equal to the predefined size. The memory pool subinstance creator 205 can obtain one or more memory pages from a storage system (not shown) and divide the one or more memory pages into portions of a size equal to the predefined size. In one embodiment, the memory pool subinstance creator 205 associates the portions of memory with the identifier stored in the current subinstance 260. In an alternate embodiment, the memory pool subinstance creator 205 associates the portions of memory with the memory pool subinstance identifier most recently stored in the memory pool subinstance identifiers 255. In one embodiment, the memory pool subinstance creator 205 stores the portions of memory associated with the memory pool subinstance in a memory, such as memory pool subinstance memory portions 265 in data store 250.

The memory pool subinstance creator 205 can receive a request to change the size of the portions in a memory pool. In one embodiment, the request to change the size of the portions of the memory pool includes a memory pool instance identifier. In this embodiment, the updated size of the portions of the memory pool is a previous size of the portions of the memory pool, such as the original size of the portions when the memory pool instance 200 was initially created. In an alternate embodiment, the request to change the size of the portions of the memory pool includes an updated size for the portions of the memory pool. In one such embodiment, the updated size is a differential size to use to update existing portions of the memory pool (e.g., add 2 bytes to the existing portions, delete 2 bytes from the existing portions, etc.). In an alternate such embodiment, the updated size is a size for each portion of the memory pool (e.g., 202 bytes, 204 bytes, etc.).

Upon receiving the request to change the size of the portions of the memory pool, the memory pool subinstance creator 205 can create a memory pool subinstance for the updated size. The memory pool subinstance creator 205 can create the memory pool subinstance by generating an identifier for the memory pool subinstance and creating a memory pool associated with the memory pool subinstance with portions of memory equal to the updated size.

In one embodiment, the memory pool subinstance creator 205 generates a random identifier for the memory pool subinstance. In this embodiment, the random number can be unique to the memory pool subinstance created to allow unique identification of a memory pool allocated from the subinstance. In an alternate embodiment, the memory pool subinstance creator 205 generates an identifier for the memory pool subinstance based on the identifier stored in the current subinstance 260. In another alternate embodiment, the memory pool subinstance creator 205 generates an identifier for the memory pool subinstance based on a subinstance identifier previously generated by the memory pool subinstance creator 205. The identifier for the memory pool subinstance is stored in a memory, such as memory pool subinstance identifiers 255 in data store 250. The memory pool subinstance identifiers 255 can store an identifier for each memory pool subinstance created by memory pool subinstance creator 205. In one embodiment, the memory pool subinstance identifiers stored in memory pool subinstance identifiers 255 are stored in an ascending or descending order based on when the memory pool subinstance identifiers were created.

The memory pool subinstance creator 205 can store the identifier of the memory pool subinstance identifier in current subinstance 260. In one embodiment, the current subinstance 260 stores the memory pool subinstance most recently created by memory pool subinstance creator 205. In an alternate embodiment, the current subinstance 260 stores the memory pool subinstance most recently used by the memory pool instance 200.

The memory pool subinstance creator 205 can create a memory pool associated with the memory pool subinstance. The memory pool can include portions of memory whose size is equal to the updated size. The memory pool subinstance creator 205 can obtain one or more memory pages from a storage system (not shown) and divide the one or more memory pages into portions of a size equal to the updated size. In one embodiment, the memory pool subinstance creator 205 associates the portions of memory with the identifier of the memory pool subinstance. In one embodiment, the memory pool subinstance creator 205 stores the portions of memory associated with the memory pool subinstance in a memory, such as memory pool subinstance memory portions 265 in data store 250. The memory pool subinstance creator 205 can create a memory pool with portions of memory whose size is equal to the updated size.

The memory portion allocation module 210 can receive a request to allocate a portion of memory. The memory portion allocation module 210 can determine an identifier for the memory pool subinstance from which to obtain a portion of memory by accessing the current subinstance 260. The memory portion allocation module 210 can determine whether there is a portion of memory available to allocate. The memory portion allocation module can access the memory portions in a memory, such as memory pool subinstance memory portions 265 in data store 250, and determine if any of the memory portions include the identifier for the memory pool subinstance from which to obtain the portion of memory.

If there is a portion of memory available to allocate, the memory portion allocation module 210 can associate the identifier of the memory pool subinstance from which the portion of memory was allocated with the portion of memory and send the portion of memory (either the portion itself or an identifier for the portion of memory, such as the memory address where the portion of memory starts) to a computing system (not shown). If there is no portion of memory available to allocate, the memory portion allocation module 210 can obtain a memory page from a storage system (not shown), divide the memory page into portions of the updated size, associate the identifier of the memory pool subinstance from which the portion of memory was allocated with one of the portions of memory, and send the portion of memory to the computing system. In one embodiment, the memory portion allocation module 210 can update a reference count associated with the memory pool subinstance upon allocating the portion of memory. In one embodiment, the memory portion allocation module 210 can store the updated reference count for the memory pool subinstance in a memory, such as the memory pool subinstance reference counts 270 in data store 250.

The memory pool deallocation module 215 can receive a request to deallocate a portion of memory. The memory pool deallocation module 215 can determine a memory pool subinstance to which to return a portion of memory by accessing an identifier associated with the portion of memory. The memory pool deallocation module 215 can deallocate the portion of memory by adding an identifier for the portion of memory to a list of available memory portions in a memory, such as the memory pool subinstance memory portions 265 in data store 250.

The memory pool deallocation module 215 can update a reference count associated with the memory pool subinstance once the portion of memory has been deallocated. In one embodiment, the memory portion deallocation module 215 can store the updated reference count for the memory pool subinstance in a memory, such as the memory pool subinstance reference counts 270 in data store 250.

In some embodiments, upon updating the reference count, the memory portion deallocation module 215 determines whether the memory pool subinstance associated with the updated reference count is equal to the current subinstance. In some embodiments, upon updating the reference count, the memory portion deallocation module 215 determines whether the reference count associated with the memory pool subinstance is equal to a predetermined value (e.g., 0). In some embodiments, if the memory pool subinstance is not equal to the current subinstance and if the reference count associated with the memory pool subinstance is equal to a predetermined value, the memory portion deallocation module 215 returns the memory associated with the memory pool subinstance to a storage system (not shown) and deletes the memory pool subinstance. In one embodiment, the memory portion deallocation module 215 deletes the memory pool subinstance by deleing the identifier for the memory pool subinstance from the memory pool subinstance identifiers 255 and by deleting the portions of memory associated with the identifier for the memory pool subinstance from memory, such as from the memory pool subinstance memory portions 265 in data store 250.

Figure 3:
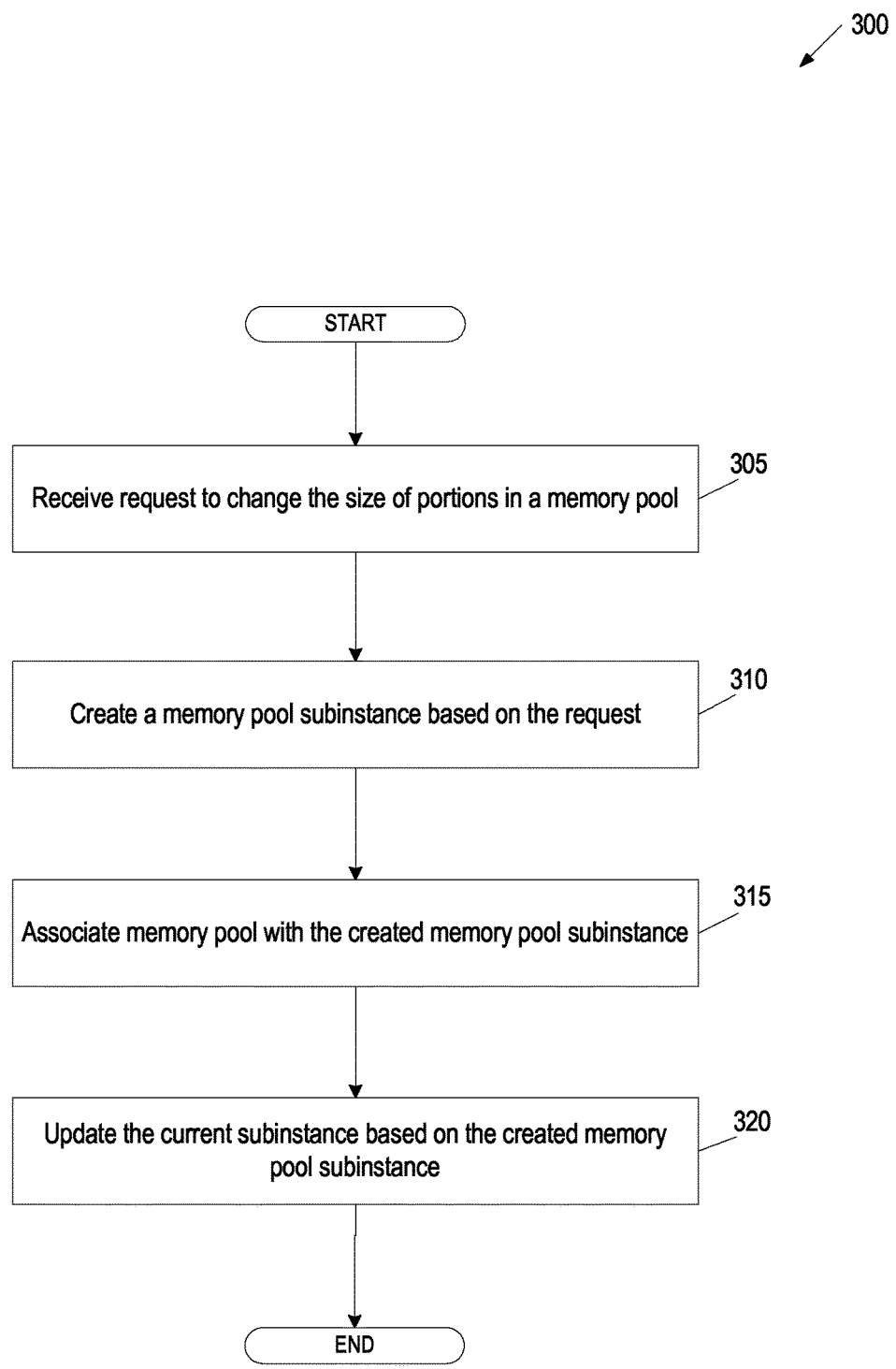
FIG. 3 is a flow diagram illustrating an embodiment for a method of updating data fields of a buffer, in accordance with an embodiment.

FIG. 3 is a flow diagram of an embodiment of a method 300 for updating portions of memory in a memory pool, such as the data fields of a buffer. The method 300 is performed by processing logic that may comprise hardware (circuitry, dedicated logic, etc.), software (such as is run on a general purpose computer system or a dedicated machine), or a combination of both. In one embodiment, the method 300 is performed by the memory pool instance 200 of FIG. 2.

At block 305, processing logic receives a request to update the size of portions in a memory pool. In one embodiment, the request is received from an operating system (e.g., Linux® operating system, Windows® operating system, etc.). In an alternate embodiment, the request is received from a software application.

In one embodiment, the request is a request to add a predefined number of bytes to each portion in a memory pool (e.g., add metadata to a slab cache). In an alternate embodiment, the request is a request to remove a predefined number of bytes from each portion in a memory pool (e.g., remove metadata from a slab cache). In one embodiment, the request to update the size of portions in a memory pool includes an identifier for a memory pool instance (e.g., a handle) and a number of bytes to use to update a current number of bytes associated with the identifier. In this embodiment, if the number of bytes is a positive value, the updated size of the portions of the memory pool is a current size of the portions of the memory pool associated with the memory pool instance (based on the current subinstance) plus the number of bytes in the request. In this embodiment, if the number of bytes is a negative value, the updated size of the portions of the memory pool is a current size of the portions of the memory pool associated with the memory pool instance (based on the current subinstance) minus the number of bytes in the request. For example, if a current size of portions of the memory pool was 100 bytes, and a request to "add metadata (X, 2) was received, the updated size would be 100 bytes+2 bytes=102 bytes. In another example, if a current size of portions of the memory pool was 102 bytes, and a request to "delete metadata (X, −2) was received, the updated size would be 102 bytes−2 bytes=100 bytes. In this embodiment, whether bytes are added or deleted from portions of a memory pool depend on the name of the request to update the size. If the request is an add request, such as "add metadata (X, number)", the number of bytes specified in the request can be added to the current size of portions of memory associated with X. If the request is a delete or remove request, such as "remove metadata (X, number)", the number of bytes specified in the request can be deleted from the current size of portions of memory associated with X.

In an alternate embodiment, the request to update the size of portions in a memory pool includes an identifier for a memory pool instance (e.g., a handle) and a size for each portion of the memory pool (e.g., 202 bytes, 204 bytes, etc.). For example, if the request included a size equal to 100 bytes, portions of memory each having a size of 100 bytes would be created.

In one embodiment, if the request is a request to remove a predefined number of bytes from each portion in a memory pool, the request includes an identifier for a memory pool instance (e.g., a handle) and an identifier for a memory pool subinstance (e.g., handle). In this embodiment, processing logic determines that the request is to remove the bytes previously added to the portions of memory when the memory pool subinstance was created. For example, a first change request for a memory pool instance X generates a memory pool subinstance identifier Y and adds 2 bytes to the existing portions of memory. A second change request that includes the memory pool instance X and memory pool subinstance identifier Y would be a request to remove the 2 bytes of data previously added to the portions of memory when the memory pool subinstance Y was created.

At block 310, processing logic creates a memory pool subinstance based on the request. In one embodiment, processing logic creates the memory pool subinstance by generating an identifier for the memory pool subinstance.

In one embodiment, the processing logic generates a random identifier for the memory pool subinstance. In an alternate embodiment, the processing logic generates an identifier for the memory pool subinstance based on a current subinstance (e.g., that represents the last identifier created by the processing logic). In another alternate embodiment, the processing logic generates an identifier for the memory pool subinstance based on a subinstance identifier previously generated by the processing logic. The processing logic can store the identifier for the memory pool subinstance in a memory.

In one embodiment, prior to generating the identifier for the memory pool subinstance, processing logic determines if the computing system includes a maximum number of memory pool subinstances that can exist simultaneously. If processing logic determines that the computing system includes a maximum number of memory pool subinstances that can exist at a time, processing logic determines if the maximum number of memory pool subinstances has been reached. If the maximum number of memory pool subinstances has been reached, processing logic can wait until a memory pool subinstance is deleted or deallocated prior to generating an identifier for the memory pool subinstance. For example, if the computing system is limited to having two memory pool subinstances, processing logic will determine whether there are two currently existing memory pool subinstances. If two memory pool subinstances have already been generated, an additional memory pool subinstance will not be generated until one of the existing memory pool subinstances has been deleted or deallocated. In one embodiment, processing logic waits for a predetermined amount of time and determines whether the maximum number of memory pool subinstances has been reached once the predetermined amount of time has passed. In an alternate embodiment, processing logic receives a notification when a memory pool subinstance has been deleted or deallocated. If the maximum number of memory pool subinstances has not been reached, processing logic generates the identifier for the memory pool subinstance.

At block 315, processing logic associates a memory pool with the created memory pool subinstance. Processing logic can associate the memory pool with the created memory pool subinstance by obtaining a predetermined amount (e.g., a page) of memory from a storage system, dividing the predetermined amount of memory into portions of a size equal to the updated size, and associating the identifier for the created memory pool subinstance with the portions.

In one embodiment, processing logic can divide the portions of memory by recording a start boundary (e.g., memory address) and an end boundary (e.g., memory address) within the memory for each portion. For example, for a predetermined amount of memory that is 400 bytes and a portion size of 100 bytes, portion 0 can be recorded as having a start boundary of 0 and an end boundary of 99, portion 1 can be recorded as having a start boundary of 100 and an end boundary of 199, portion 2 can be recorded as having a start boundary of 200 and an end boundary of 299, and portion 3 can be recorded as having a start boundary of 300 and an end boundary of 399. In an alternate embodiment, processing logic can divide the portions of memory by reallocating portions of memory previously obtained from a storage system. For example, if a previous memory pool subinstance included 400 bytes of memory with each memory pool previously sized to 50 bytes, with none of the memory currently allocated to a memory pool, processing logic can create memory pools of size 100 bytes for the new memory pool subinstance by recording new boundaries for the 400 bytes of memory (e.g., 0 to 99 for the first portion, 100 to 199 for the second portion, 200 to 299 for the third portion, and 300 to 399 for the fourth portion).

In one embodiment, processing logic associates the identifier for the created memory pool subinstance with the portions by storing the start boundary and end boundary for each portion with the identifier. In an alternate embodiment, processing logic associates the identifier for the created memory pool subinstance with the portions by storing the identifier with the portions of memory (e.g., storing the identifier before the first portion of memory and allocating the portions of memory immediately after the identifier).

In one embodiment, if the request is a request to delete or remove bytes from the portions of memory, the method 300 skips block 310 and block 315, processing logic deletes the memory pool subinstance identified in the delete or remove command, and the method 300 proceeds from block 305 to block 320.

At block 320, processing logic updates a current subinstance based on the identifier. The current subinstance can represent the memory pool subinstance to allocate objects from upon receiving an allocation request. In one embodiment, the current subinstance is the memory pool subinstance most recently created by the processing logic. In an alternate embodiment, the current subinstance is the memory pool subinstance most recently used by the processing logic. In one embodiment, the current subinstance is updated to the value of the identifier for the created memory pool subinstance. In an alternate embodiment, the current subinstance is updated by setting a pointer to the identifier for the created memory pool subinstance. Other embodiments for updating the current subinstance based on the identifier for the created memory pool subinstance can be used. In another alternate embodiment, if the request is a delete or remove request, and processing logic removed the memory pool subinstance identified in the request, the current subinstance is updated to an identifier of a memory pool subinstance used prior to the deleted memory pool subinstance being created.

Figure 4:
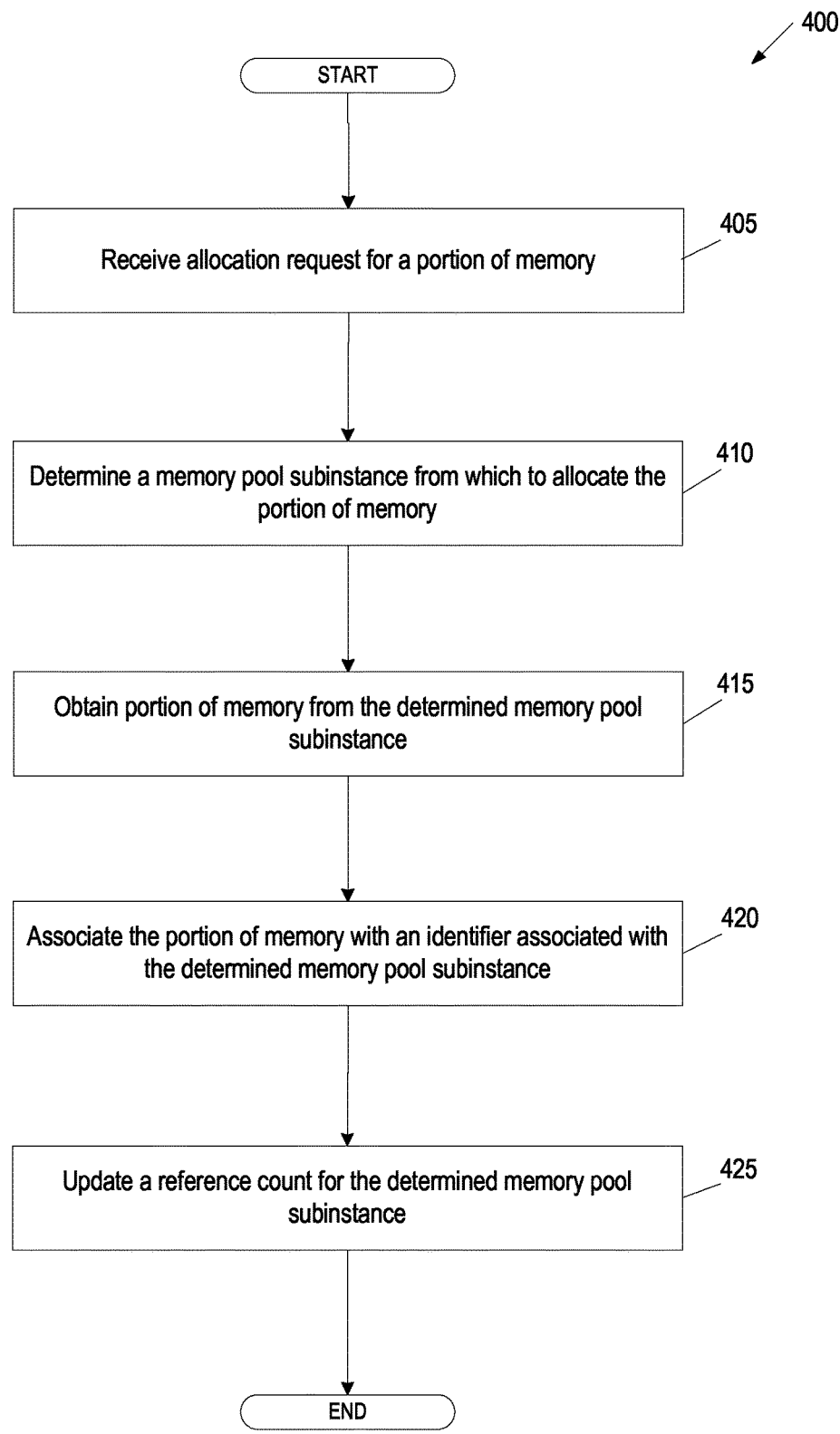
FIG. 4 is a flow diagram illustrating an embodiment for allocating a buffer, in accordance with an embodiment.

FIG. 4 is a flow diagram of an embodiment of a method 400 for method of a allocating a portion of memory, such as a buffer. The method 400 is performed by processing logic that may comprise hardware (circuitry, dedicated logic, etc.), software (such as is run on a general purpose computer system or a dedicated machine), or a combination of both. In one embodiment, the method 400 is performed by the memory pool instance 200 of FIG. 2.

At block 405, processing logic receives an allocation request. In one embodiment, the request is received from an operating system (e.g., Linux® operating system, Windows® operating system, etc.). In an alternate embodiment, the request is received from a memory management application. In one embodiment, the allocation request includes an identifier for a memory pool instance from which to allocate the object. In an alternate embodiment, the allocation request does not include an identifier for a memory pool instance and a default memory pool instance (e.g., last used memory pool instance) is used for the request.

At block 410, processing logic determines a memory pool subinstance from which to allocate the portion of memory. Processing logic can determine the memory pool subinstance by accessing a current subinstance for the memory pool instance used for the request. In one embodiment, the current subinstance is an identifier for the most recently created memory pool subinstance (and corresponding portions of memory). In an alternate embodiment, the current subinstance is an identifier for the most recently used memory pool subinstance (and corresponding portions of memory).

At block 415, processing logic obtains a portion of memory from the determined memory pool subinstance. In one embodiment, processing logic obtains the portion of memory from the determined memory pool subinstance by sending a request to the determined memory pool subinstance for a portion of memory. In an alternate embodiment, processing logic obtains the portion of memory accessing the portions of memory associated with the determined memory pool subinstance and determining if there is a portion of memory available to allocate. Processing logic can determine if any of the memory portions are available to allocate by determining whether any of the portions of memory include the identifier for the determined memory pool subinstance. If there is no portion of memory available to allocate, processing logic can obtain a memory page from a storage system and divide the memory page into portions of the updated size.

At block 420, processing logic associates the portion of memory with an identifier associated with the determined memory pool subinstance. In one embodiment, processing logic associates the portion of memory with the identifier by writing the identifier to the portion of memory. In an alternate embodiment, processing logic associates the portion of memory with the identifier by creating a pointer in the portion of memory that points to the identifier.

At block 425, processing logic updates a reference count for the determined memory pool subinstance. The reference count can represent the number of portions of memory allocated by the determined memory pool subinstance. In one embodiment, processing logic can update the reference count by incrementing the count by a value (e.g., 1).

Figure 5:
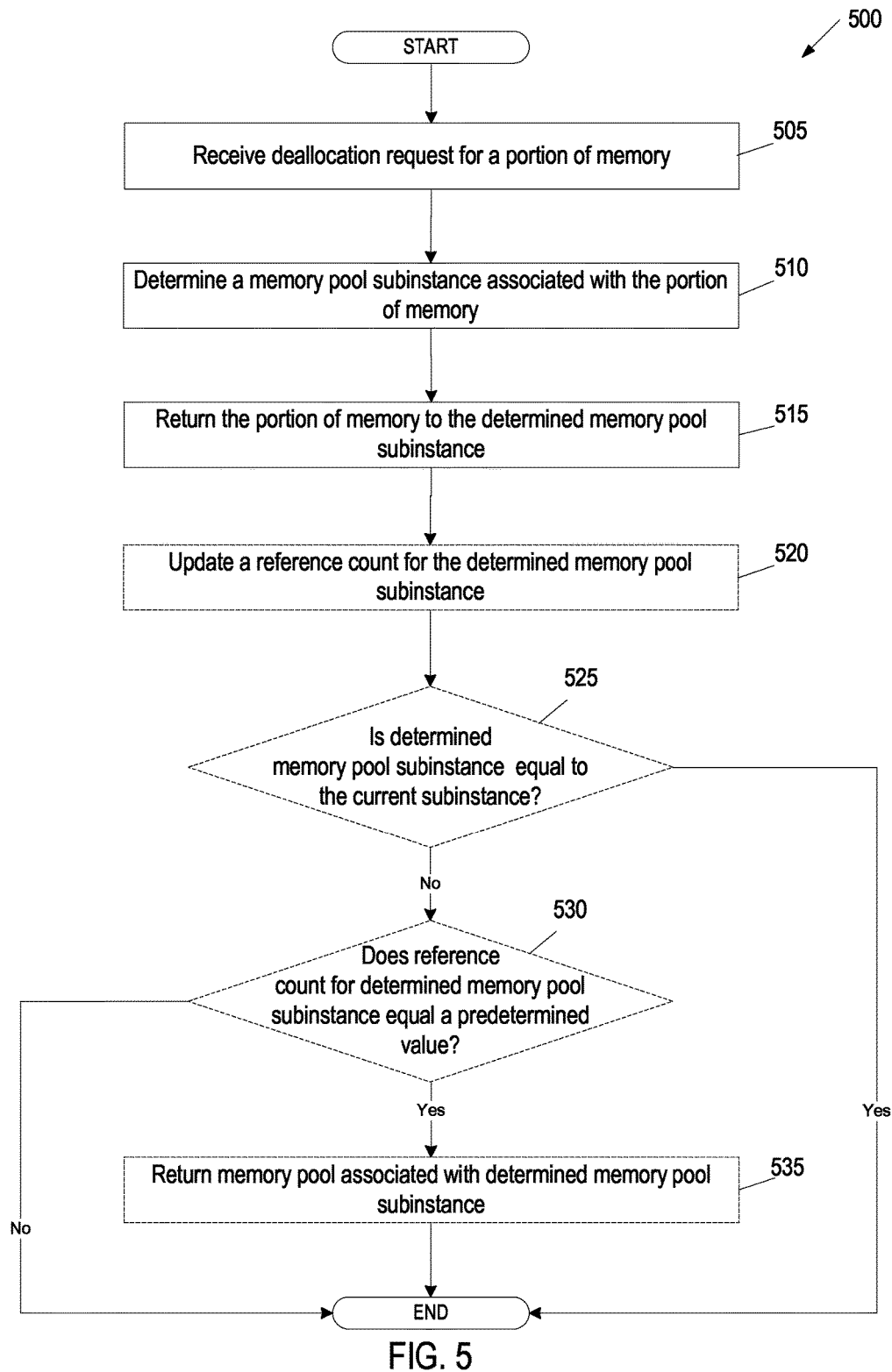
FIG. 5 is a flow diagram illustrating an embodiment for deallocating a buffer, in accordance with an embodiment.

FIG. 5 is a flow diagram of an embodiment of a method 500 for deallocating a portion of memory, such as a buffer. The method 500 is performed by processing logic that may comprise hardware (circuitry, dedicated logic, etc.), software (such as is run on a general purpose computer system or a dedicated machine), or a combination of both. In one embodiment, the method 500 is performed by the memory pool instance 200 of FIG. 2.

At block 505, processing logic receives a deallocation request for a portion of memory. In one embodiment, the deallocation request is received from an operating system (e.g., Linux® operating system, Windows® operating system, etc.). In an alternate embodiment, the request is received from a memory management application.

At block 510, processing logic determines a memory pool subinstance to which to return the portion of memory. Processing logic can determine the memory pool subinstance for the portion of memory using an identifier associated with the portion of memory. The identifier can represent the memory pool subinstance that allocated the portion of memory. In one embodiment, the portion of memory includes the identifier. In an alternate embodiment, the portion of memory points to the identifier.

At block 515, processing logic returns the object to the determined memory pool subinstance. In one embodiment, processing logic returns the portion of memory to the memory pool subinstance by adding an identifier for the portion of memory (e.g., memory range, starting memory address, ending memory address, etc.) to a list of available portions of memory associated with the determined memory pool subinstance. In an alternate embodiment, processing logic returns the portion of memory to the memory pool subinstance by matching an address range for the portion of memory and adding the address range to a list of available address ranges associated with the determined memory pool subinstance.

At optional block 520, processing logic updates a reference count associated with the memory pool subinstance. The reference count can represent the number of portions of memory allocated by the determined memory pool subinstance. In one embodiment, processing logic can update the reference count by decrementing the count by a value (e.g., 1) to represent the fact that a portion of memory has been deallocated or returned to the determined memory pool subinstance.

At optional block 525, processing logic determines whether the determined memory pool subinstance is not the current subinstance. In one embodiment, processing logic determines whether the determined memory pool subinstance is not equal to the current subinstance by comparing an identifier associated with the determined memory pool subinstance to an identifier associated with the current subinstance. In one embodiment, if the determined memory pool subinstance is equal to the current subinstance, portions of memory may still be allocated from the determined memory pool subinstance. If processing logic determines that the determined memory pool subinstance is equal to the current subinstance, the method 500 ends. If processing logic determines that the determined memory pool subinstance is not equal to the current subinstance, the method 500 proceeds to optional block 530.

At optional block 530, processing logic determines whether the reference count for the determined memory pool subinstance is equal to a predetermined value. In one embodiment, processing logic determines whether the reference count for the determined memory pool subinstance is equal to a predetermined value by comparing the reference count to the predetermined value (e.g., 0, 1, 2, etc.). In one embodiment, the predetermined value is zero, meaning that the determined memory pool subinstance no longer has any allocated portions of memory associated with it. In other embodiments, the predetermined value can be a non-zero value. If processing logic determines that the reference count for the determined memory pool subinstance is not equal to a predetermined value, the method 500 ends. If processing logic determines that the reference count for the determined memory pool subinstance is equal to a predetermined value, the method 500 proceeds to optional block 535.

At optional block 535, processing logic returns the memory pool associated with the determined memory pool subinstance. In one embodiment, processing logic returns the memory associated with the determined memory pool subinstance to the storage system from which the memory was previously received (e.g., during an allocation request, when a memory pool for the memory pool subinstance was obtained, etc.). In an alternate embodiment, processing logic returns the memory associated with the determined memory pool subinstance to an operating system or a memory management application from which the deallocation request was received. In some embodiments, processing logic deletes the determined memory pool subinstance upon returning the memory pool associated with the determined memory pool subinstance. In one embodiment, processing logic deletes the memory pool subinstance by deleing the identifier for the memory pool subinstance and by deleting the portions of memory associated with the identifier for the memory pool subinstance.

Figure 6:
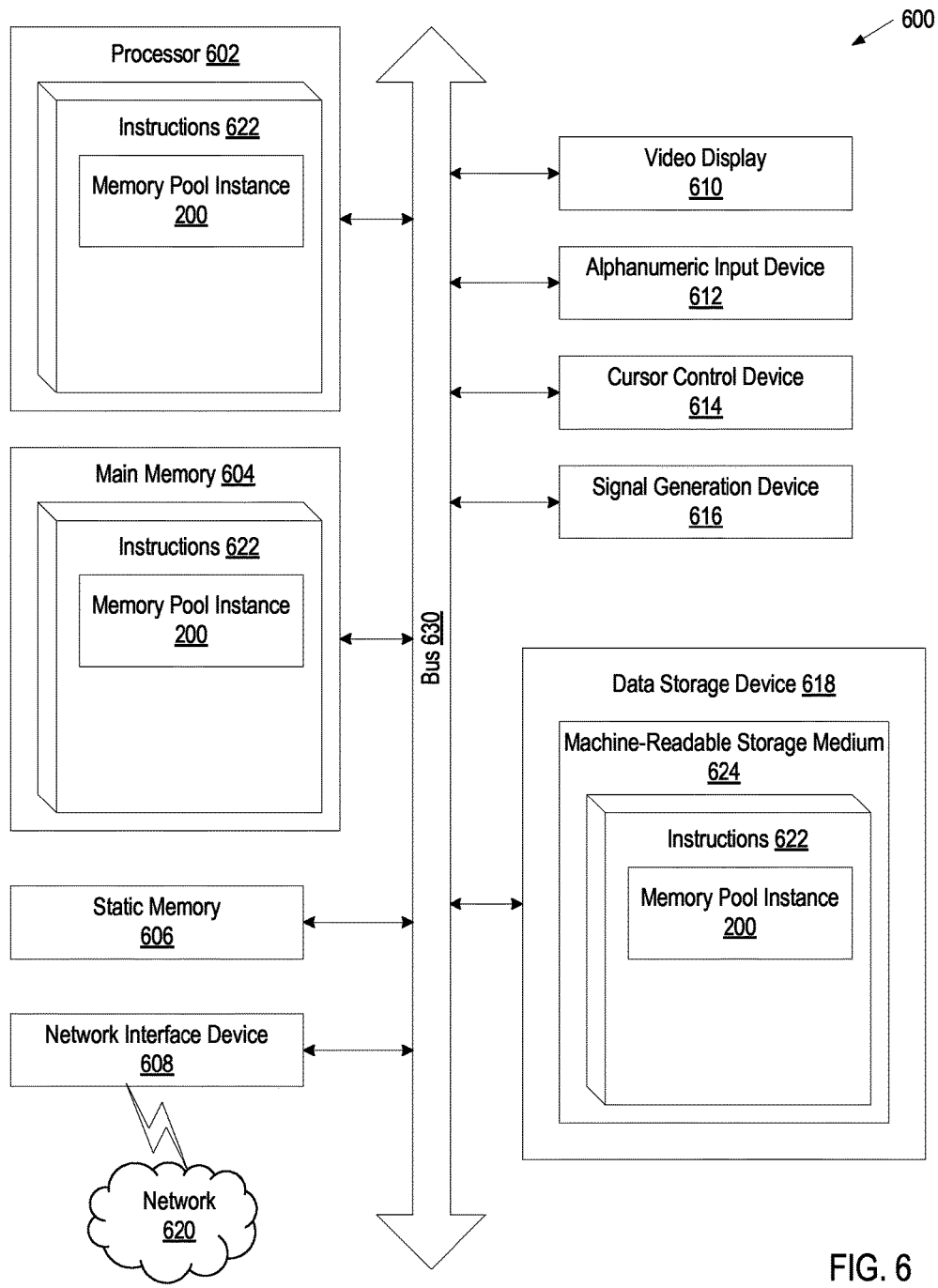
FIG. 6 is a block diagram of an example computer system that may perform one or more of the operations described herein.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one embodiment, the instructions 622 include instructions for a memory pool instance 200, and/or a software library containing methods that dynamically update portions of memory in a memory pool, such as dynamically updating data fields of buffers.

While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies described herein. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "creating," "receiving," "associating," "analyzing," "determining," "enabling," "identifying," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a processing device, a request to update a first size of a plurality of portions of memory in a memory pool instance, wherein the memory pool instance is associated with a first memory pool subinstance and a first identifier for the first memory pool subinstance;
   creating, by the processing device, a second memory pool subinstance from the first memory pool subinstance in view of the request, wherein the second memory pool subinstance comprises portions of memory of a second size, wherein the creating of the second memory pool subinstance comprises adjusting the first size of the plurality of portions of memory associated with the memory pool instance to correspond with the second size;
   generating, by the processing device, a second identifier for the second memory pool subinstance in view of the first identifier, the second memory pool subinstance is used to allocate new objects in response to an allocation request;
   adding, by the processing device, the second identifier to a list of available memory portions for the memory pool instance; and
   deleting, by the processing device, the first identifier associated with the first memory pool subinstance from the list of available memory portions.

2. The method of claim 1, wherein the request to update the first size comprises the first identifier for the first memory pool subinstance.

3. The method of claim 1, wherein the request to update the first size is a request to add a plurality of bytes to the plurality of portions of memory associated with the first memory pool subinstance.

4. The method of claim 1, wherein the request to update the first size is a request to remove a plurality of bytes from the plurality of portions of memory associated with the first memory pool subinstance.

5. The method of claim 1, wherein adjusting the first size comprises adjusting a start boundary and an end boundary in memory for each of a plurality of portions of memory associated with the first memory pool subinstance.

6. A non-transitory computer readable storage medium having instructions that, when executed by a processing device, cause the processing device to:
   receive, by the processing device, a request to update a first size of a plurality of portions of memory in a memory pool instance, wherein the memory pool instance is associated with a first memory pool subinstance and a first identifier for the first memory pool subinstance;
   create, by the processing device, a second memory pool subinstance from the first memory pool subinstance in view of the request, wherein the second memory pool subinstance comprises portions of memory of a second size, wherein to create the second memory pool subinstance comprises the processing device to adjust the first size of the plurality of portions of memory associated with the memory pool instance to correspond with the second size;

generate, by the processing device, a second identifier for the second memory pool subinstance in view of the first identifier, the second memory pool subinstance is used to allocate new objects in response to an allocation request;

add, by the processing device, the second identifier to a list of available memory portions for the memory pool instance; and delete, by the processing device, the first identifier associated with first memory pool subinstance from the list of available memory portions.

7. The non-transitory computer readable storage medium of claim 6, wherein the request to update the first size comprises the first identifier for the first memory pool subinstance.

8. The non-transitory computer readable storage medium of claim 6, wherein the request to update the first size is a request to add a plurality of bytes to the plurality of portions of memory associated with the first memory pool subinstance.

9. The non-transitory computer readable storage medium of claim 6, wherein the request to update the first size is a request to remove a plurality of bytes from the plurality of portions of memory associated with the first memory pool subinstance.

10. A computing device comprising:
a memory comprising a plurality of portions; and
a processing device operatively coupled to the memory, wherein the processing device is to:
   receive a request to update a first size of a plurality of portions of memory in a memory pool instance, wherein the memory pool instance is associated with a first memory pool subinstance and a first identifier for the first memory pool subinstance;
   create a second memory pool subinstance from the first memory pool subinstance in view of the request, wherein the second memory pool subinstance comprises portions of memory of a second size, wherein to create the second memory pool subinstance comprises the processing device to adjust the first size of the plurality of portions of memory associated with the memory pool instance to correspond with the second size;
   generate a second identifier for the second memory pool subinstance in view of the first identifier, the second memory pool subinstance is used to allocate new objects in response to an allocation request;
   add the second identifier to a list of available memory portions for the memory pool instance; and
   delete the first identifier associated with first memory pool subinstance from the list of available memory portions.

11. The computing device of claim 10, wherein the request to update the first size comprises the first identifier for the first memory pool subinstance.

12. The computing device of claim 10, wherein the request to update the first size is a request to add a plurality of bytes to the plurality of portions of memory associated with the first memory pool subinstance.

13. The computing device of claim 10, wherein the request to update the first size is a request to remove a plurality of bytes from the plurality of portions of memory associated with the first memory pool subinstance.

* * * * *